United States Patent
Patil

(10) Patent No.: US 8,641,531 B2
(45) Date of Patent: * Feb. 4, 2014

(54) MOBILE PHONE GAME INTERFACE

(75) Inventor: Pramod P. Patil, Belmont, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,832

(22) Filed: Jun. 11, 2012

(65) Prior Publication Data

US 2012/0244952 A1    Sep. 27, 2012

Related U.S. Application Data

(63) Continuation of application No. 12/133,968, filed on Jun. 5, 2008, now Pat. No. 8,200,795.

(51) Int. Cl.
*A63F 13/06* (2006.01)

(52) U.S. Cl.
USPC ............... 463/42; 463/36; 463/37; 709/222; 709/228; 717/178

(58) Field of Classification Search
USPC .......... 463/36, 37; 273/148 B; 709/222, 228; 717/178
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,396,267 A | 3/1995 | Bouton | |
| 5,528,265 A | 6/1996 | Harrison | |
| 5,551,701 A | 9/1996 | Bouton et al. | |
| 5,610,631 A | 3/1997 | Bouton et al. | |
| 5,838,307 A | 11/1998 | Bouton | |
| 5,896,125 A | 4/1999 | Niedzwiecki | |
| 5,959,596 A | 9/1999 | McCarten et al. | |
| 6,157,368 A | 12/2000 | Faeger | |
| 6,270,415 B1 | 8/2001 | Church et al. | |
| 6,375,572 B1 | 4/2002 | Masuyama et al. | |
| 6,511,378 B1 | 1/2003 | Bhatt et al. | |
| 6,874,029 B2 | 3/2005 | Hutcheson et al. | |

(Continued)

OTHER PUBLICATIONS

Bolt, "Put-that-there: voice and gesture at the graphics interface," Computer Graphics, vol. 14, No. 3, (ACM SIGGRAPH Conference Proceedings) Jul. 1980, pp. 262-270.

(Continued)

*Primary Examiner* — Ronald Laneau
*Assistant Examiner* — Ross Williams
(74) *Attorney, Agent, or Firm* — Kilpatrick Townsend & Stockton

(57) ABSTRACT

Systems, apparatus and methods for enabling a mobile station to control a virtual world being executed on a console system are described. The method can include establishing a communication link between the mobile station and a console system, identifying user interface characteristics of the mobile station, and providing a game controller application to the mobile station, the game controller application being based on the identified user interface characteristics and configured to transform user interface inputs into game controller commands. The method can further include receiving signals containing data representing the game controller commands from the mobile station over the communication link and determining game results based on the received game controller commands. In one aspect, the system includes a controller application server storing multiple game controller applications for mobile stations characterized by different user interfaces.

20 Claims, 9 Drawing Sheets

(56) References Cited

U.S. PATENT DOCUMENTS

| | | |
|---|---|---|
| 7,164,907 B2 | 1/2007 | Cochran et al. |
| 7,580,728 B2 | 8/2009 | Vance et al. |
| 7,833,098 B2 | 11/2010 | Ohta |
| 8,200,795 B2 * | 6/2012 | Patil .............................. 709/222 |
| 2002/0085097 A1 | 7/2002 | Colmenarez et al. |
| 2004/0212589 A1 | 10/2004 | Hall et al. |
| 2004/0259537 A1 | 12/2004 | Ackley |
| 2005/0262438 A1 | 11/2005 | Armstrong et al. |
| 2006/0111190 A1 | 5/2006 | Yoshino et al. |
| 2007/0087830 A1 | 4/2007 | Varma et al. |
| 2007/0099703 A1 | 5/2007 | Terebilo |
| 2009/0231178 A1 * | 9/2009 | Letourneur et al. .......... 341/176 |
| 2011/0294569 A1 | 12/2011 | Tone et al. |

OTHER PUBLICATIONS

"Brass Monkey to Exhibit Cloud-Based Game System Featuring Smartphones as Controllers with Verizon Wireless at CES", Jan. 10, 2012, MarketWatch, retrieved from www.marketwatch.com on Feb. 6, 2012.

DeWitt et al., "Pantomation: A System for Position Tracking," Proceeding of the $2^{nd}$ Symposium on Small Computers in the Arts, Oct. 1982, pp. 61-69.

* cited by examiner

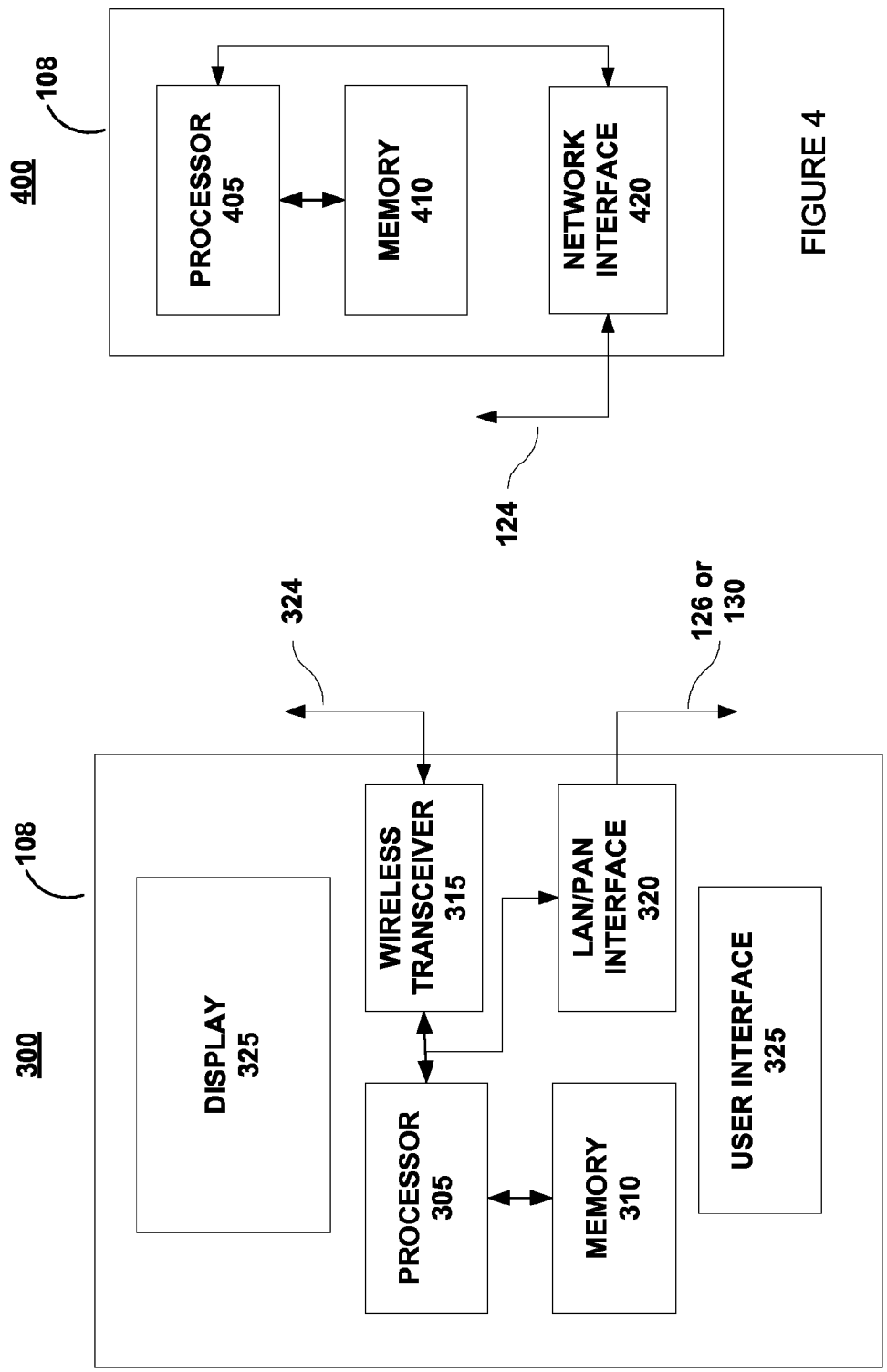

MOBILE PHONE GAME INTERFACE

CROSS-REFERENCE TO RELATED APPLICATIONS

This is a continuation application of parent U.S. patent application Ser. No. 12/133,968 entitled "Mobile Phone Game Interface," which is hereby incorporated herein by reference.

BACKGROUND OF THE INVENTION

1. Field of the Invention

The invention relates to the field of video games, and specifically to methods and systems for controlling a video game using a mobile phone.

2. Background of the Invention

The continual advancement of computer processing power is evident in the field of computer based gaming Processor intensive video games were once available only in standalone dedicated units manufactured for use in arcades. As computer processing capabilities advanced, the price of powerful processors and associated electronics such as memory, interface chips, and displays, decreased to a level that allowed processor based games to be produced for the consumer market.

Video game systems include a console system or core unit that includes a processor, memory (e.g., Random Access Memory), and audio visual subsystems such as a co-processor. The console system serves as a hub between the video display or monitor, various controllers (e.g., joy sticks and other user interface devices), and external memory devices containing the game software.

Originally, game controllers were typically wired to the console and were designed to send input signals to the console system over the wired connection. In recent times, wireless game controls have emerged. The wireless game controls allow for a user not to be tethered to the console system. The wireless game controls were generally designed to be compatible with a single console system.

In recent times, individuals utilize many mobile and/or wireless devices in their every day lives. These devices include multiple remote controls, lap top computers, cell phones, smart phones, Personal Digital Assistants (PDAs), and other mobile devices. The ever increasing number of these devices can be overwhelming and frustrating. Adding a wireless game controller to this already large list of devices adds to the frustration. It would be advantageous to better utilize the existing mobile devices instead of adding another wireless device dedicated to controlling a video game console system.

BRIEF SUMMARY OF THE INVENTION

A system, apparatus and method for controlling a console system with a mobile station are described. A console system displays a virtual world and receives inputs from a mobile station of one or more users interacting with the virtual world. The console system can identify user interface characteristics of the mobile station. A game controller application can be communicated to the mobile station. The game controller application can be configured based on the identified user interface characteristics.

The game controller application can utilize a wireless interface of the mobile station to send game control signals to the console system. The console system can receive the game control signals from the mobile station and determine game results based on the received game controller commands.

In one aspect, the disclosure includes a method of enabling a mobile station to control a game. The method of this aspect includes establishing a communication link between the mobile station and a console system, identifying user interface characteristics of the mobile station, providing a game controller application to the mobile station, the game controller application being based on the identified user interface characteristics and configured to transform user interface inputs into game controller commands. The method further includes receiving signals containing data representing the game controller commands from the mobile station, and determining game results based on the received game controller commands.

In another aspect, the disclosure includes a system for enabling a mobile station to control a game. The system of this aspect includes a local area network (LAN) interface configured to establish a communication link between the mobile station and a console system, and receive signals containing data representing game controller commands from the mobile station. The system further includes a game controller application module configured to identify user interface characteristics of the mobile station, and provide a game controller application to the mobile station, the game controller application being based on the identified user interface characteristics and configured to transform user interface inputs into the game controller commands, and a game subsystem configured to determine game results based on the received game controller commands.

In another aspect, the disclosure includes a method of controlling a game using a mobile station. The method of this aspect includes establishing a communication link between the mobile station and a console system, transmitting mobile station identifying information to the console system, and receiving a game controller application, the game controller application corresponding to the mobile station identifying information, and configured to transform inputs to a user interface of the mobile station into game controller commands. The method further includes storing the game controller application in memory, executing the game controller application, and transmitting signals containing data representing the game controller commands to the console system.

In another aspect, the disclosure includes a mobile station for controlling a game. The mobile station of this aspect includes a network interface configured to establish a communication link between the mobile station and a console system, transmit mobile station identifying information to the console system, receive a game controller application based on the mobile station identifying information, and transmit signals containing data representing game controller commands to the console system. The mobile station further includes a processor configured to store the game controller application in memory and execute the game controller application, wherein the game controller application is configured to transform inputs to a user interface of the mobile station into the game controller commands.

In another aspect, the disclosure includes a method of distributing game controller applications. The method of this aspect includes storing a plurality of game controller applications in memory, the plurality of game controller applications being configured to be executed on one of a plurality of different mobile stations, and configured to generate game controller commands in response to inputs from a plurality of different mobile station user interfaces. The method further includes receiving mobile station identifying information from a communication device, and transmitting game controller application data to the communication device, the game controller application data corresponding to one or more of user interface characteristics of the identified mobile station, and a make and model of the identified mobile station.

In another aspect, the disclosure includes a system for distributing game controller applications. The system of this aspect includes memory for storing a plurality of game controller applications, the plurality of game controller applications being configured to be executed on different mobile stations, and configured to generate game controller commands in response to inputs from different mobile station user interfaces. The system further includes a network interface, and a processor in electrical communication with the memory and the network interface and configured to receive mobile station identifying information from a remote communication device over a network, and transmit a game controller application to the remote communication device, the game controller application being based on the received mobile station identifying information.

BRIEF DESCRIPTION OF THE DRAWINGS

The features, objects and advantages of embodiments of the disclosure will become more apparent from the detailed description set forth below when taken in conjunction with the drawings, in which like elements bear like reference numerals.

FIG. 3 is a functional block diagram of an example of a mobile station for controlling a game being executed on the console systems of FIG. 1 or 2.

FIG. 4 is a functional block diagram of an example of a controller application server for providing game controller applications to the console systems of FIG. 1 or 2 and/or the mobile station of FIG. 3.

DETAILED DESCRIPTION OF THE INVENTION

Advances in technology in recent years have resulted in the emergence of multitudes of mobile and/or wireless devices including lap top computers, cell phones, smart phones, Personal Digital Assistants (PDAs), and other mobile devices. Individuals are utilizing mobile devices for more and more of their every day tasks including shopping, calendars, scheduling meetings, receiving emails, etc. These types of mobile devices often support one or more wireless communication technologies. Console systems can also support these wireless communications technologies and can establish wireless connections with these various mobile devices.

However, console systems have not exploited interacting with these types of wireless devices. One reason that these devices have not been exploited to interact with game console systems is that they typically have very different user interfaces. It was not feasible to design control signaling methods to make the use of the wide ranging mobile station user interfaces in a way that provided a pleasant and user friendly experience.

Figure 1:
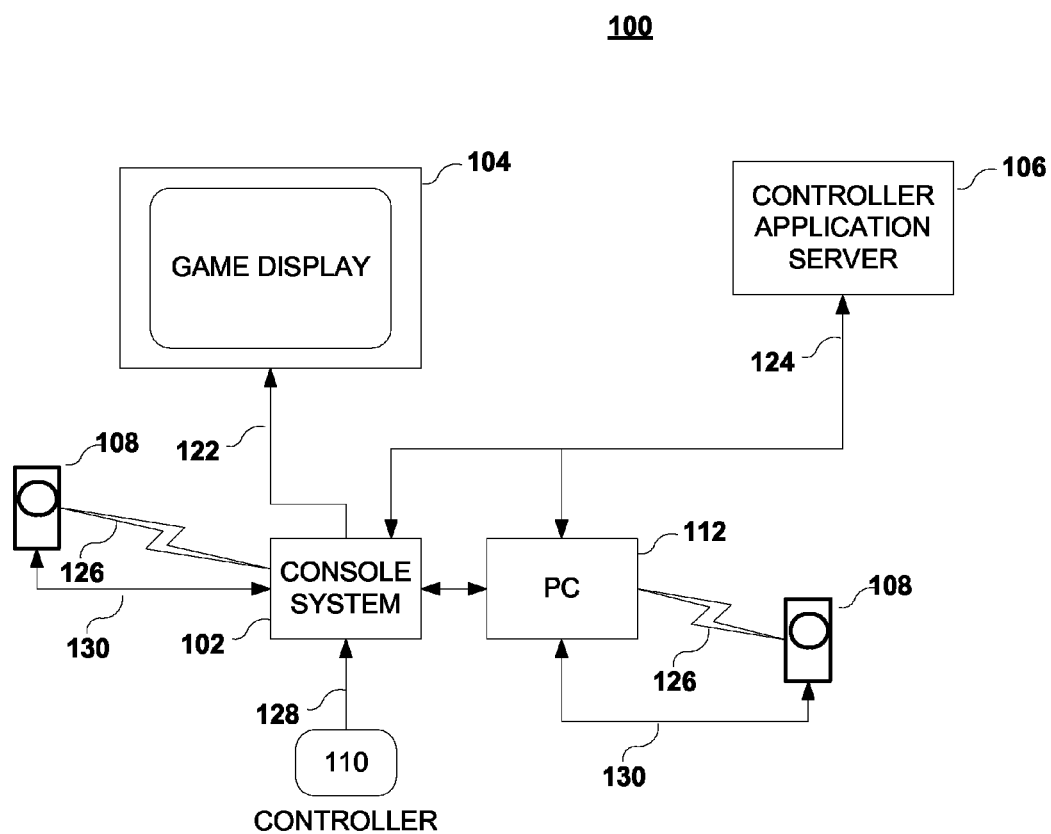
FIG. 1 is a block diagram illustrating an example system in which a console system displays a game sequence on a video display and receives game controller commands from one or more mobile stations.

FIG. 1 is a block diagram illustrating an example system 100 in which a console system 102 displays, in one aspect, a game sequence on a video display 104 and receives game controller commands from one or more mobile stations 108. The console system 102 is an interactive computer or electronic device that drives the video display 104 via a communication link 122 to display a virtual world. The communication link 122 can be a wire line (e.g., USB, or a cable) or a wireless connection (e.g., 802.x, Bluetooth, or any wireless communication technology).

The console system 102 can receive inputs form one or more game controllers 110. The game controller 110 is connected to the console 102 via a communication link 128. The communication link 128 can be a wire line connection (e.g., USB, or a cable) or a wireless connection (e.g., 802.x, Bluetooth, or any wireless communication technology). The game controller 110 can include one or more input devices such as a joystick, a mouse, toggle switches, etc.

In addition to games, other types of virtual worlds can be displayed on the video display 104 by the console system 102. The virtual world displayed on the video display 104 can be a two dimensional or three dimensional virtual world where a user can manipulate and interact with on screen objects by providing inputs to the virtual world through the game controller 110. The virtual world can also be an educational sequence of images and/or videos where the user progresses through the educational course based on interactions with on screen buttons, menus, etc. The virtual world can also be a commercial tour such as a store, catalog or warehouse where the user progresses through a virtual shopping spree through the catalog or store or warehouse. Other virtual worlds can also be depicted.

In addition to or as a substitute for the game controller 110, the console system 102 can also receive inputs from one or more mobile stations 108. As used herein, a mobile station refers to a device such as a cellular or other wireless communication device, personal communication system (PCS) device, personal navigation device, laptop or other suitable mobile station capable of receiving and processing wireless signals such as cellular, satellite, wide area networks, metropolitan area networks, etc. The term "mobile station" is also intended to include devices which communicate with a personal navigation device (PND), such as by short-range wireless (e.g., local area networks or personal area networks), infrared, wireline connection, or other connection. Also, "mobile station" is intended to include all devices, including wireless communication devices, computers, laptops, etc. which are capable of communication with a server, such as via the Internet, WiFi, or other network. Any operable combination of the above are also considered a "mobile station."

In one aspect, the console system 102 and the mobile station 108 establish a wireless communication link 126 between the console system 102 and the mobile station 108. The wireless communication link 126 can be, for example, a short range wireless network such as a Bluetooth network, an 802.11x network or an 802.15x network. In another aspect, the console system 102 and the mobile station 108 communicate over a wire line communication link 130 such as, for example, one utilizing a Universal Serial Bus (USB) connection.

The establishment of the communication link 126 or 130 can utilize any of various device discovery protocols and can be initiated by either the console system 102 or the mobile station 108. In one aspect, the console system 102 detects the presence of the mobile station 108 and the console system can initiate the establishment of the communication link. In another aspect, the mobile station 108 can initiate establishment of the communication link 126, e.g., by sending a paging signal.

In yet another aspect, an intermediate device such as a personal computer (PC) 112 can communicate with the console system 102 and the mobile station 108 on a wireless communication link 126 or a wired link 130. In this aspect, the PC 112 can communicate with the console system 102. The PC 112 can forward any game controller commands and other signals received from the mobile station 108 to the console system 102. Likewise, the PC 112 can perform the functions of the console system 102 in establishing either the wireless communication link 126 or the wired communication link 130 between the PC 112 and the mobile station 108.

The system 100 also includes, in some aspects, a controller application server 106. The controller application server 106 stores a plurality of game controller applications configured for user interfaces of multiple mobile stations 108. The controller application server 106 is connected to a network 124 that can also be accessed by the console system 102, the PC 112 and/or the mobile station 108, depending on the aspect. By identifying the type of user interface elements of the mobile station 108, a proper game controller application can be communicated to the mobile station 108, either by the console system 102, the PC 112 or the controller application server 106.

Figure 2:
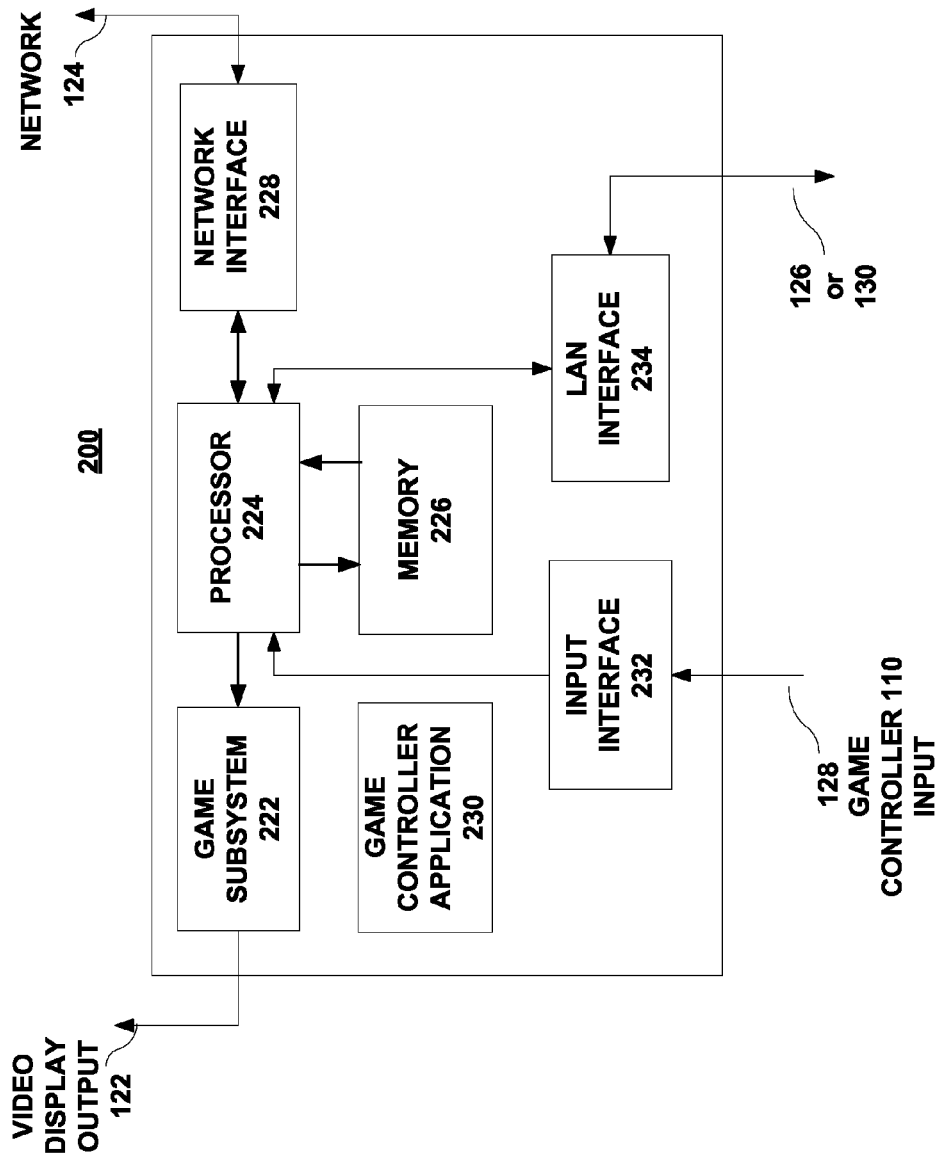
FIG. 2 is a functional block diagram of an example of a console system for displaying a virtual world on a video display and receiving game controller commands from one or more mobile stations.

FIG. 2 is a functional block diagram of an example of a console system 200 for displaying a virtual world on a video display and receiving game controller commands from one or more of the mobile stations 108. For example, all or portions of the console system 200 can be contained in the console system 102 and/or the PC 112 of the system 100 of FIG. 1. In this example, the console system 200 includes one or more processors 224. The processor 224 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 224 is configured to store data received by one or more interfaces and process and store the data on a memory 226. The memory 226 can be implemented within the processor 224 or external to the processor 224. As used herein, the term memory refers to any type of long term, short term, volatile, nonvolatile, or other memory and is not to be limited to any particular type of memory or number of memories or type of media upon which memory is stored.

The processor 224 is also configured to communicate data and/or instructions to and/or from a game subsystem 222, a network interface 228, a local area network (LAN) interface 234 and an input interface 232. The game subsystem 222 is configured to provide video and audio data to the video display 104 over the video connection 122. The game subsystem 222 receives various instructions from the processor 224. The instructions can include user inputs received from the game controller 110 via the input interface 232, or from the one or more mobile stations 108 via the LAN interface 234. In either case, the user inputs are used by the game subsystem 222 to affect the sequence of events of the virtual world that is being displayed. Using the inputs, the game subsystem 222 executes the virtual world instructions to display the resulting video and audio sequence on the video display 104.

The game subsystem 222 can interface with a virtual world subsystem (not shown). The virtual world subsystem could be in the form of software, hardware and/or firmware. In the case of the virtual world subsystem comprising software, the virtual world software could be contained in internal memory such as the memory 226. The virtual world subsystem could also be an external device such as a video cartridge, video DVD or CD, or other form of interactive video device. The video output of the game subsystem 222 is determined by the interactions between the game subsystem 222 and the virtual world subsystem and depends on the user inputs that are received.

The input interface 232 is configured to receive signals from the game controller 110 over the communication link 128. As discussed above, the game controller 110 can include one or more types of input devices including, for example, a joystick, a keyboard, a mouse, a touchpad, a toggle switch, a track ball, a scroll wheel, etc. In one aspect, the user input signals received by the input interface 232 can be forwarded to the processor 224 as they are received. In other aspects, the input interface 232 can process the received input and transform them into another format before forwarding the transformed inputs to the processor 224. For example, the received inputs can be analog signals, and the input interface can transform these to digital signals in a predetermined format.

The LAN interface 234 is configured to transmit and receive data over the wireless connection 126 or the wired connection 130 discussed above, e.g., from the one or more wireless stations 108. The LAN interface 234 can receive information related to identifying the user interface characteristics of the mobile station 108. The LAN interface 234 can transmit game controller application data to the mobile station 108, where the game controller application is configured based on the identified user interface characteristics of the mobile station 108.

The LAN interface 234 can receive the game control commands from the mobile station 108. The LAN interface 234 can also transmit and receive signals necessary for establishing and maintaining the communication links 126 and/or 130 between the console system 200 and the mobile station 108. In aspects where a wireless connection 126 is used, the LAN interface 234 can be configured to communicate over a short range wireless network such as an IEEE 802.11x network, a Bluetooth network, an IEEE 802.15x, or some other type of network.

The network interface 228 is configured to transmit and receive data over the network 124. The network 124 can include one or more wired and/or wireless networks. In one aspect, the network 124 is used to communicate with the controller application server 106 as illustrated in the example system 100 of FIG. 1. The network interface 228 can receive the information representing the game controller application from the controller application server 106.

As discussed above, portions of the console system 200 can be located in the PC 112 of the system 100 illustrated in FIG. 1. For example, the network interface 228 and the LAN interface 234 could be located in the PC serving as an intermediary between the mobile station 108 and the console system 102. In this aspect, the PC 112 can forward data received from the mobile station 108 to the console system 102 and forward data received from the console system 102 to the mobile station 108. In addition, for aspects where the network interface 228 is contained in the PC 112, the game controller application can be obtained by the PC 112 from the controller application server 106 and forwarded to the mobile station 108.

The processor 224 is also configured to perform instructions for executing the methods of a game controller application module 230. The game controller application module 230 can include firmware and/or software implementations of the methodologies discussed below. In the case of software implementations, the software code of the game controller application module 230 can be stored on the memory 226.

In one aspect, the game controller application module 230 can identify user interface characteristics of the mobile station 108 that is being used as a game controller. In this aspect, the game controller application module 230 provides to the mobile station 108, a game controller application that is based on the identified user interface characteristics of the mobile station 108. The game controller application is configured to transform user interface inputs into game controller commands which are communicated to the game subsystem 222 for execution.

The user interface characteristics can be identified in different ways. For example, in one aspect, the game controller application module 230 can receive make and model information about the mobile station 108 (e.g., using the International Mobile Equipment Identity or IMEI). The user interface characteristics of different makes and models of mobile stations can be contained in a database. In another aspect, the game controller application module 230 can receive user interface description data directly from the mobile station 108. In this aspect, the user interface description data can be received in a standardized form such as the Human Interface Device (HID) profile of the USB standard (also used by the Bluetooth standard). The HID protocol enables a device, such as the console systems 102 or 200, for example, to discover the feature set of the user interface of another device, such as the mobile station 108, for example. In either aspect, the game controller application module 230 can identify the user interface characteristics of the specific make and model and create or obtain a game controller application based on the identified user interface.

In one aspect, the game controller application module 230 can create a game controller application based on the identified user interface characteristics of the mobile station 108. The user interface can comprise one or more input devices including a key pad, a toggle switch, a roller, a joy stick, a touchpad, a track ball, a scroll wheel, etc. The game controller application can then map different game commands to the actuation signals of the identified input devices. In the case of the user interface comprising one or more touchpads, the game controller application could map various finger gestures to the game controller commands.

In another aspect, the game controller application module 230 can obtain a preconfigured game controller application. For example, if the user interface information comprises a make and model (or IMEI) of the mobile station, a database of game controller applications can be searched for an application corresponding to the make and model. The database of applications can be local to the console system 200 (e.g., in memory 226 or a CD or DVD or other memory device). The database of game controller applications could also be located externally in the controller application server 106 or in the PC 112.

In some aspects, the game controller application module 230 can be located entirely, or partially in the game controller application server 106. In these aspects, user interface identifying information can be transmitted to the game controller application server 106 from the console system 200 or from the PC 112 depending on the aspect. In these aspects, the information that is to be communicated to the mobile station 108 can be transmitted to the console system 200, to the PC 112 or directly to the mobile station 108 from the game controller application server 106.

FIG. 3 is a functional block diagram of an example of a mobile station 108 for controlling a game being executed on the console systems 102 or 200 of FIG. 1 or 2. In this example, the mobile station 108 includes one or more processors 305, a wireless transceiver 315, a local area network (LAN) or personal area network (PAN) interface 320, a user interface 325 and optionally a display 330. The processor 305 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 305 is configured to store data received by the wireless transceiver 315 and the LAN/PAN interface 320 and process and store the data on a memory 310. The memory 310 can be implemented within the processor 305 or external to the processor 305. As used herein, the term memory refers to any type of long term, short term, volatile, nonvolatile, or other memory and is not to be limited to any particular type of memory or number of memories or type of media upon which memory is stored.

The processor 305 is also configured to execute the game controller application provided to the mobile station 108. The game controller application can be downloaded or otherwise received by the mobile station 108, e.g., via the LAN/PAN interface 320, via the wireless transceiver 315 or from a memory device such as a CD, DVD, memory stick, etc. The processor can store the game controller application in the memory 310. In some aspects, the processor can execute the game controller application using a platform independent system. For example, the processor could execute a game controller application in the form of a Java Applet using a Java Virtual Machine.

The processor 305 is also configured to receive input signals from the user interface 325. The user interface 325 can comprise one or more input devices including a key pad, a toggle switch, a roller, a joy stick, a touchpad, a track ball, a scroll wheel, etc. The user interface elements are configured to generate these input signals when the user manipulates, actuates, or in some way interacts with the various user interface elements. The processor 305 processes the received input signals using the game controller application. Upon execution, the game controller application generates game controller commands in response to the input signals.

The processor 305 can also be configured to drive the display 330 to display graphics associated with the user interface 325 of the mobile station 108 as well as data related to data received by the wireless transceiver 315 or the LAN/PAN interface 320. For example, game results that are communicated to the mobile station 108 from the console system 102 can be displayed on the display 330.

The wireless transceiver 315 can be configured to receive and transmit over a wireless network 324. The wireless transceiver 315 can be configured to operate over any of several networks including a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

The wireless transceiver 315 can be omitted in some aspects of mobile stations 108. For example, PDA's, laptop computers, and navigation devices do not necessarily include the wireless transceiver 315.

The LAN/PAN interface 320 can be configured to receive and transmit over a wired LAN or PAN 130. The LAN/PAN interface 320 can also be configured to receive and transmit over a wireless LAN or PAN 126 or other type of short range wireless network. Such short range wireless networks include an IEEE 802.11x network, a Bluetooth network, an IEEE 802.15x, or some other type of network. The LAN/PAN interface 320 can transmit the game controller commands generated by the game controller application to the console system 102, or the PC 112.

FIG. 4 is a functional block diagram of an example of a controller application server 106 for providing game controller applications to the console systems 102 or 200 of FIG. 1 or 2, the PC 112 of FIG. 1, and/or the mobile station 108 of FIG. 3. In this example, the controller application server 106 includes one or more processors 405, and a network interface 420. The processor 405 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 405 is configured to store data received by the network interface 420 and on a memory 410. The memory 410 can be implemented within the processor 405 or external to the processor 405. As used herein, the term memory refers to any type of long term, short term, volatile, nonvolatile, or other memory and is not to be limited to any particular type of memory or number of memories or type of media upon which memory is stored.

The memory 410 can also store previously generated versions of game controller applications that are configured based on the user interface characteristics of multiple types of mobile stations 108. By locating the game controller applications in the controller application server 106, new and/or updated game controller applications can be made available to the console system 102 or 200. In this way new mobile station user interfaces can be accommodated and improvements can be made to previous game controller applications.

In some aspects, the controller application server 106 includes all or part of the game controller application module 230 discussed above in reference to FIG. 2. For example, the console system 200 could simply send the make and model information to the controller application server 106 which could then create a new controller application or retrieve an existing one. The controller application server 106 could then transmit the game controller application to the console system 200. In another aspect, the mobile station 108 itself could obtain the controller application directly from the controller application server 106. In this aspect, the console system could forward the URL of the controller application server 106 to the mobile station 108, which could then retrieve the selected game controller application.

The game controller applications can be in the form of an applet. An applet is a software component that can be invoked within the context of another program such as a operating system or web browser of the mobile station 108.

An applet is written in a compiled language as opposed to a scripted language such as HTML. Since the applet is a compiled language it can be performed more quickly than an interpreted language such as HTML. An example of one type of applet is a Java applet. A Java applet is an applet delivered in the form of Java byte code. Most mobile stations 108 support the use of Java applets through a Java Virtual Machine (JVM). However other languages can also be used for the applet of the game controller applications.

Applets can be platform independent. This is an advantage since the same game controller application (or at least a slightly modified application) could be used for any mobile stations with similar or identical user interface characteristics.

The game controller applications can be downloaded to the mobile station 108 and executed within the environment of the operating system of the mobile station 108 (or within another application such as a web browser). The game controller application can be written such that upon execution within the mobile station 108, the game controller application invokes a library of wireless functions of the LAN/PAN interface 320 in the mobile station 108. The wireless library can be a short range wireless library such as an IEEE 802.11x library, a Bluetooth library, and IEEE 802.15x library, or other short range wireless library.

By invoking the library functions of the mobile station 108, the game controller application can perform the communications with the console system 200 to control the actions of the game being executed.

Figure 5:
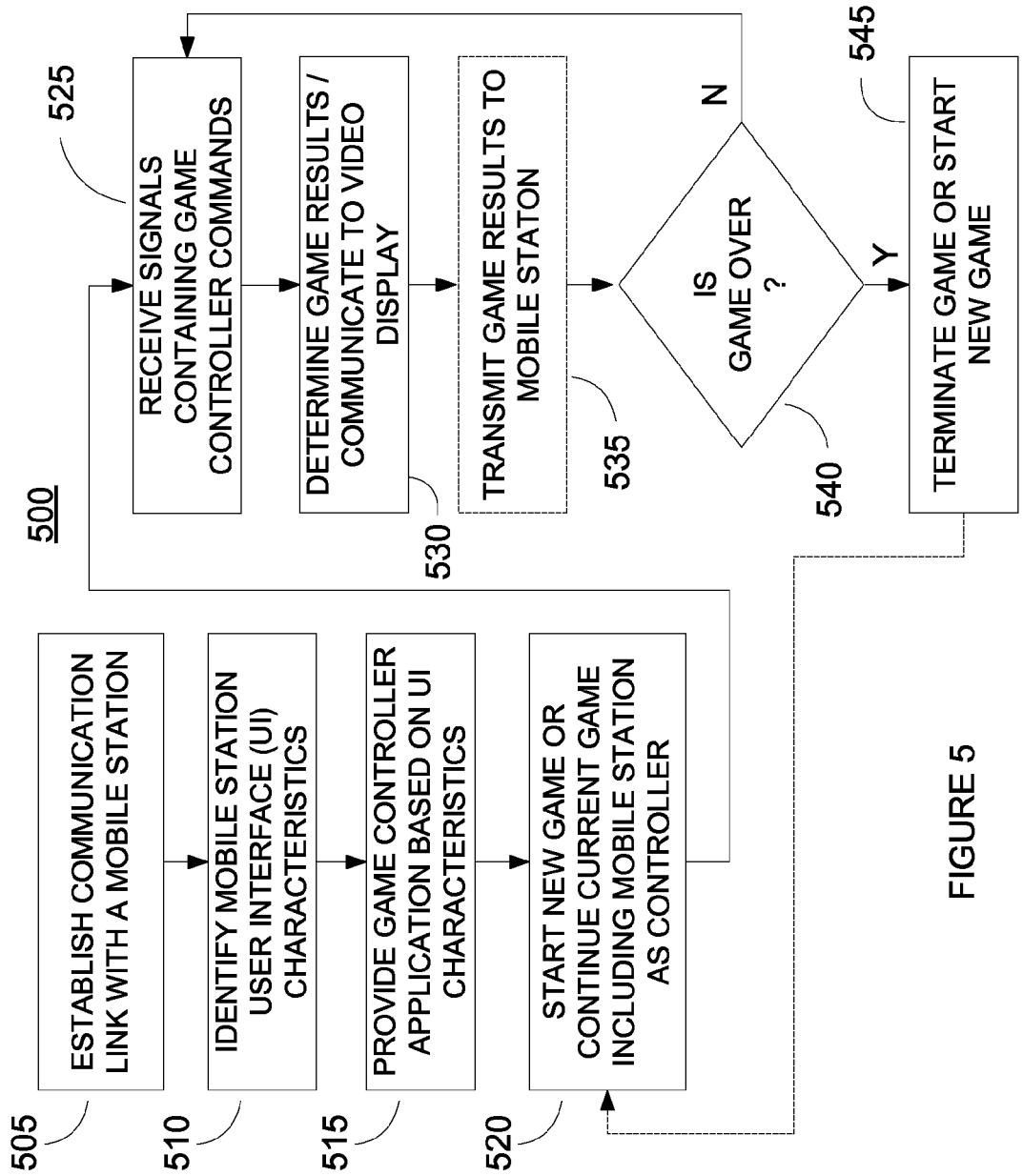
FIG. 5 is a flowchart illustrating an example of a method of enabling a mobile station to control a game being executed on a console system.

FIG. 5 is a flowchart illustrating an example of a method 500 of enabling a mobile station to control a game being executed on a console system. The process 500 can be executed, for example, on the console system 200 of FIG. 2. As was discussed above, portions of the console system 200 can be located in the PC 112 of FIG. 1, e.g., the LAN interface 234 and/or the network interface 228.

The method 500 starts at block 505 where the LAN interface 234 establishes a communication link with the mobile station 108 (via the LAN/PAN interface 320). The communication link can be, for example, over the wired connection 130 or the wireless connection 126. The wired connection 130 can be, for example, a USB connection. The wireless connection can be, for example, a short range wireless connection over a network such as n IEEE 802.11× network, a Bluetooth network, an IEEE 802.15x, or some other type of network.

The establishment of a wired communication link 130 at the block 505 can utilize protocols such as are established in the USB standard. The establishment of a short range wireless connection 126 can utilize any of various device discovery protocols and can be initiated by either the console system 200 or the mobile station 108. In one aspect, the console system 200 detects the presence of the mobile station 108 and the console system can initiate the establishment of the short range wireless connection 126. In another aspect, the mobile station 108 can initiate establishment of the short range wireless connection, e.g., by sending a paging signal.

Multiple communication links can be established between the console system 200 and multiple mobile stations 108 by performing the functions at the block 505 multiple times.

Upon establishing the communication link at the block 505, the process 500 continues to block 510 where the console system 200 identifies user interface characteristics of the mobile station 108. In one aspect, the console system 500 requests and receives, via the LAN interface 234, information identifying the make and model (e.g., the IMEI in the case of a mobile phone) of the mobile station 108. Using the IMEI, or other make and model identifier, the game controller application module 230 can identify the user interface characteristics, or alternatively identify a pre-configured game controller application based on the identified user interface characteristics.

In another aspect, the mobile station 108 and the console system 200 can utilize the HID protocol to allow the console system to discover the user interface characteristics of the mobile station. The HID protocol is supported by both the USB standard and the Bluetooth short range wireless standard. Other interface protocols may also be used.

Use of a protocol such as the HID protocol enables the console system 200 to utilize a single HID driver for parsing and dynamically associating I/O data with application functionality, such as user supplied game control commands. The HID protocol enables discovery of the I/O features of devices such as a keyboard, mouse, touchpad, pointing stick, trackball, a scroll wheel and others.

When utilizing the HID protocol at the block 510, the console system 200 is the "host" device and the mobile station 108 is the "client" device, using the HID terminology. The mobile station "client" presents an "HID descriptor" to the console system "host" device. The presentation of the HID descriptor to the console system can be done utilizing the "report mode" of the HID protocol. The HID descriptor is an array of bytes that describe the mobile station's data packets that result from actuation of the different input devices in the user interface 325. The HID descriptor can include the number of data packets supported by the mobile station user interface 325, the size of the packets and the purpose of each bit in the packets. Upon receiving the HID descriptor from the mobile station 108 at the block 510, the console HID driver of the console system 200 can parse the HID descriptor and discover the user interface characteristics of the mobile station 108.

In aspects where the PC 112 is acting as an intermediary between the console system 200 and the mobile station 108, the HID driver can be in the PC 112. In these aspects, the parsing of the HID descriptor and received packets can be performed by the processor of the PC 112.

Upon identifying the user interface characteristics at the block 510, the process 500 continues to block 515 where the game controller application module 230 provides a game controller application to the mobile station 108. The game controller application is based on the identified user interface characteristics of the mobile station 108. The game controller application can be provided to the mobile station in several different ways, depending on the aspect.

In one aspect, the game controller application module 230 obtains a preconfigured game controller application and transmits the game controller application to the mobile station 108. The game controller application can be obtained from internal or external memory available to the console system 200 (e.g., a hard disk drive, an external DVD or CD or memory card, or from the PC 112). The game controller application can also be obtained from a third party such as, for example, the controller application server 106.

Regardless of where the preconfigured game controller application is obtained, two basic methods can be used to obtain the most appropriate application. In one aspect, pre-configured applications can be stored and cross referenced to the make and model of mobile station 108 for which they were configured. In this aspect and IMEI, or other information identifying a make and model of the mobile station 108 (which was obtained at the block 510 of the process 500), can be used to locate the game controller application. In another aspect, the preconfigured applications can be stored and cross referenced to features present in a interface device description such as an HID descriptor discussed above. In this aspect, the game controller application can be identified based on UI features that are or are not present in the HID descriptor, for example.

Upon obtaining the game controller application, the LAN interface 234 can transmit the game controller application, over the wired connection 130 or the wireless connection 126, to the mobile station 108.

In another aspect of providing the game controller application at the block 515, the game controller application can be created, e.g., by the game controller application module 230 or by the controller application server 106. The user interface characteristics can be identified by looking them up in a database of user interfaces cross referenced to make and model information. The user interface characteristics can be parsed from an interface description such as the HID descriptor. Regardless of how the user interface characteristics are identified, the game controller application can be created by mapping the signals output by the various user interface features to various input signals required to operate the game being played.

The mapping of the user interface elements to the various control commands necessary to control the game can improve the quality of the user's experience. Certain user interface elements are more appropriate for certain control commands. For example, a roller ball, joystick or touch pad, or other analog-type controllers can be more appropriate for controlling movement of a curser or other analog-type of command. An analog-type command is a command characterized by two or more parameters. Analog types of commands include for example, pressing of a gas pedal (where the distance pressed determines the acceleration), moving an object in two dimensions, moving an object in one direction at a variable speed or acceleration, hitting a ball at a variable energy level, etc. Discrete user interface elements such as keys, toggle switches, etc. can be more appropriate for discrete events. Discrete events can include anything from the use of a particular weapon, turning on a virtual machine, choosing a yes or no answer to a question, etc.

The game controller application module 230 can be configured to map the various user interface elements in ways to improve the user experience. Basic rules can be derived to prioritize which user interface elements should be used for which control commands for which games. These rules can be used to map discrete user interface elements (keys, toggle switches, etc.) to discrete type controller commands and to map analog-type or multidimensional user interface elements to the analog type or multidimensional control commands. Upon creating the game controller application, the game controller application is transmitted to the mobile station 108 at the block 515.

In yet another aspect of providing the game controller application at the block 515, the game controller application can be provided by a third party, e.g., by the controller application server 106. In this aspect, the user interface characteristics can be communicated to the third party. For example, the make and model or user interface description obtained at the block 510 can be communicated from the console system 200 to the controller application server 106. The controller application server 106 can then retrieve a preconfigured controller application or create a new one using methods similar to those discussed above in reference to the game controller application module functions performed at the block 515.

A network address of the controller application server 106 can be communicated to the mobile station 108. The mobile station 108 can then download the game controller application from the controller application server 106. Alternatively, a network address that is available to the mobile station 108 can be communicated to the controller application server 106. The controller application server 106 can then download the game controller application to the network address of the mobile station 108.

Upon the game controller application being provided to the mobile station 108 at the block 515, the process 500 can proceed to block 520 where the game subsystem 222 starts a new game or other virtual world with the mobiles station 108 as a controller. In some aspects, the game can be started previous to the establishment of the communication link with the mobile station 108. In these aspects the game subsystem 222 can add the mobile station 108 as a controller into the game that is already started.

After the mobile station has been added as a controller to a new game or included in a current game at the block 520, the process 500 continues to block 525 where the LAN interface 234 receives signals containing game controller commands from the mobile station 108. The received commands contain data packets generated by the game controller application in response to the user of the mobile station 108 actuating various user interface elements. The received data packets can be processed, e.g., decoded, decrypted, de-packetized by the LAN interface 234 and/or the processor 224. The processing of the received packets can transform the controller command signals into a format that can be subsequently used by the game subsystem 222 at block 530.

At the block 530, the game subsystem 222 can determine game results based on the received and possibly processed controller commands. Determining the game results at the block 530 can include updating various states of other users participating in the game, generating video and audio data, determining the next sequence of events to proceed to, etc. In the case of video and audio data being determined, this video and audio data can be communicated by the game subsystem 222 to be displayed on the video display 104 of FIG. 1.

In one aspect, the game results generated at the block 530, and then displayed on the video display 104, can be instructions on how to use the user interface 325 of the mobile station 108 to control the various game commands. This can be done prior to starting the game, upon starting the game or in the middle of a current game (e.g., by pausing the game action or by displaying the instructions in a sub-window of the display).

In some aspects, upon determining game results at the block 530, the process 500 continues to optional block 535. Generally, the mobile station 108 has a limited display capability and/or a limited power supply. In this case, the video display 104 can be used for all or nearly all the output and the user can simply observe the display 104. However, in some aspects, video and/or audio output can be transmitted to the mobile station at optional block 535. For example, if a game of poker is being played, the hidden cards in the user's hand can be displayed only on the mobile station 108. In the aspects where optional block 535 is used, the LAN interface 234 can transmit game results to the mobile station 108 over the wired connection 130 or the wireless connection 126.

In one aspect, the game results transmitted at the optional block 535 are the instructions on how to use the user interface 325 of the mobile station 108 to control the various game commands.

Upon determining the game results at the block 530, and optionally communicating the game results to the mobile station 108 at the block 535, the process 500 continues at block 540 where the game subsystem 222 determines if the game is over. If the game is not over, the process 500 returns to block 525, in this example, to continue receiving controller commands and performing the functions at the blocks 530, 535 and 540. As discussed above, the console system 200 can perform the functions of blocks 505, 510 and 515 in order to add new mobile stations 108 to the game while the game is being executed at the blocks 525-540.

If it is determined that the game is over at decision block 540, the process 500 continues to block 545 where the game is terminated. In one aspect, upon terminating the game at the block 545, the process 500 returns to the block 520 to start a new game or at least query the user if a new game is desired. It should be noted that the blocks of method 500 in FIG. 5 can be rearranged, combined, modified and in some cases omitted.

Figure 6:
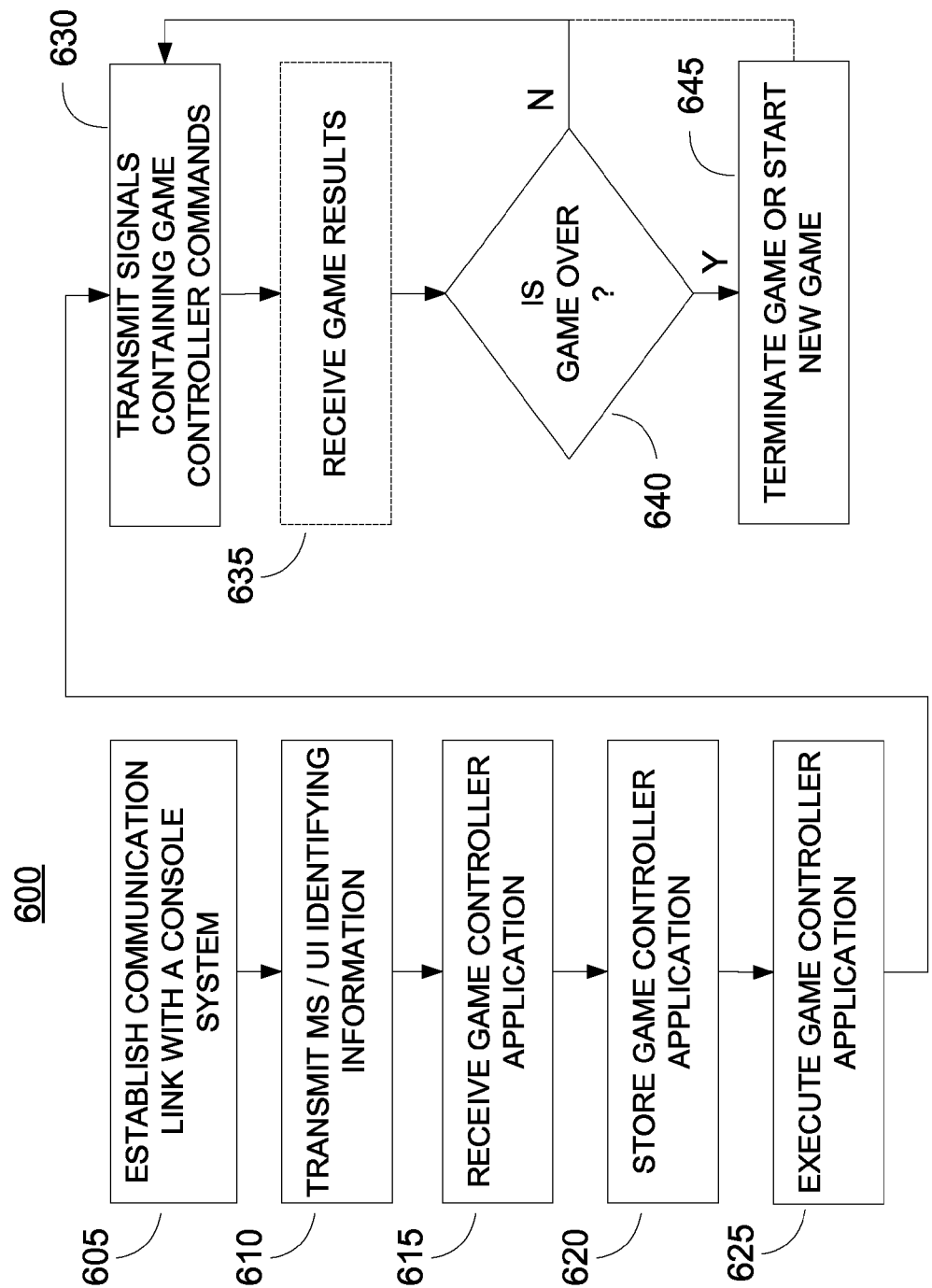
FIG. 6 is a flowchart illustrating an example of a method of controlling a game being executed on a console system using a mobile station.

FIG. 6 is a flowchart illustrating an example of a method 600 of controlling a game being executed on a console system using a mobile station. The method 600 can be executed, for example, on the mobile station 108 of FIG. 3 with the game being executed on the console system 200 of FIG. 2.

The method 600 starts at block 605 where the LAN/PAN interface 320 establishes a communication link with the LAN interface 234 of the console system 200, or an intermediary device such as the PC 112 illustrated in FIG. 1. The communication link can be, for example, over the wired connection 130 or the wireless connection 126. The wired connection 130 can be, for example, a USB connection. The wireless connection can be, for example, a short range wireless connection over a network such as n IEEE 802.11× network, a Bluetooth network, an IEEE 802.15×, or some other type of network.

The establishment of a wired communication link 130 at the block 605 can utilize protocols such as are established in the USB standard. The establishment of a short range wireless connection 126 can utilize any of various device discovery protocols and can be initiated by either the console system 200 or the mobile station 108. In one aspect, the console system 200 detects the presence of the mobile station 108 and the console system can initiate the establishment of the short range wireless connection 126. In another aspect, the mobile station 108 can initiate establishment of the short range wireless connection, e.g., by sending a paging signal.

Upon establishing the communication link at the block 605, the process 600 continues at block 610 where the LAN/PAN interface 320 transmits mobile station identifying information to the console system 200. In one aspect, the mobile station 108 transmits information identifying the make and model (e.g., the IMEI in the case of a mobile phone) of the mobile station 108. This transmission can be in response to a request message received from the console system 500. As discussed above, using the IMEI, or other make and model identifier, the game controller application module 230 of the console system can identify the user interface characteristics, or alternatively identify a pre-configured game controller application based on the identified user interface characteristics.

In another aspect, the mobile station 108 and the console system 200 can utilize the HID protocol, discussed above, to allow the console system 200 to discover the user interface characteristics of the mobile station 108. In this aspect, the mobile station identifying information is a user interface descriptor such as the HID descriptor. The HID protocol is supported by both the wired USB standard and the Bluetooth short range wireless standard and thus, both the wired connection 130 and/or the wireless connection 126 can be utilized. Other interface protocols may also be used.

As was described above, the mobile station 108 can transmit an HID descriptor to the console system 200. In aspects where the PC 112 is acting as an intermediary between the console system 102 and the mobile station 108, the HID descriptor can be transmitted to the PC 112. The HID descriptor can be stored in the memory 310 of the mobile station 108. The mobile station 108 does not need to be able to generate the HID descriptor and thus does not require being able to support an HID driver.

After transmitting the mobile station identifying information at the block 610, the process 600 continues to block 615 where the LAN/PAN interface 320 receives a game controller application corresponding to the user interface 325 of the mobile station 108. The game controller application transforms user supplied inputs (actuations of various user interface elements) into game controller commands.

As was described above, the game controller application can be obtained in different ways. In one aspect, the game controller application is received directly from the console system 200. In another aspect, the game controller application can be received from the intermediary PC 112. In another aspect, the game controller application is received from the controller application server 106. In yet another aspect, a network address of a remote supplier, such as the controller application server 106, can be received from the console system 200 or the intermediary PC 112.

In the aspect where a network address is received at the block 615, the mobile station 108 can retrieve the game controller application from the remote server at the received network address. The mobile station 108 can retrieve the game controller application by accessing the internet, for example, using an internet connection that is accessible via the LAN/PAN interface 320. Alternatively, the game controller application can be retrieved using the wireless transceiver 315 over the wireless network 324.

Upon receiving the game controller application at the block 615, the processor 305 stores the game controller application to the memory 310 at block 620. Upon storing the game controller application at the block 620, the process 600 continues at block 625 where the processor 305 executes the game controller application. The processor 305 can execute the game controller via a platform independent program such as a JVM, in aspects where the game controller application is written in a platform independent language such as Java.

The game controller application receives signals from the various user interface elements when the user of the mobile station 108 manipulates, actuates, or in some way interacts with the various user interface elements. Upon receiving these user interface generated signals, the game controller application generates game controller command data packets including the input signals or transformed versions of the inputs signals (e.g., data packets can include game input signals that have been transformed into a game controller command format compatible with the console system 200). The LAN/PAN interface 320 transmits the generated data packets containing the game controller commands at block 630.

In some aspects, the LAN/PAN interface 320 can receive game results generated by the console system 200 at optional block 635. The game results can include video to be displayed on the display 330 and/or audio. In one aspect, the game results received at the optional block 635 are instructions on how to use the user interface 325 of the mobile station 108 to control the game.

The process 600 continues to decision block 640. If it is determined at the decision block 640, that the game is not over, the process 600 loops back and game controller commands continue to be generated by the game controller application and transmitted at the block 630, and optionally game results are received at the block 635. If the processor 305 determines, at decision block 640, that the game is over, the game can be terminated at block 645, or a new game can be started. It should be noted that the blocks of method 600 in FIG. 6 can be rearranged, combined, modified and in some cases omitted.

As was described above, a short range wireless network can be utilized for communications between the mobile station 108 and the console system 102. In one aspect a Bluetooth network is used. In a Bluetooth communication system the mobile stations 108 and other enabled devices do not constantly use one frequency channel for transmission and reception in a time division multiple access manner. The Bluetooth standard also defines a combination of Time- and Frequency-Division Multiple Access (TDMA/FDMA). A Bluetooth transceiver utilizes frequency hopping to reduce interference and fading. The channel is represented by a pseudo-random hopping sequence hopping through 79 or 23 RF channels depending on the country. The hopping sequence is unique for the PAN and is determined by the Bluetooth device address of the master. The phase in the hopping sequence is determined by the Bluetooth clock of the master. The channel is divided into time slots where each slot corresponds to an RF hop frequency.

Consecutive hops correspond to different RF hop frequencies. The nominal hop rate is 1600 hops/s. Typically, all Bluetooth devices participating in the PAN are time and hop synchronized to the channel. The channel is divided into time slots of 625 µs in length. In the time slots a master and slave can transmit packets. There are two types of links that can be established between the master and the slave: Synchronous Connection-Oriented (SCO) link and Asynchronous Connection-Less (ACL) link.

The SCO link is a point-to-point link between a master and a single slave in the PAN. The master maintains the SCO link by using reserved slots at regular intervals. As the SCO link reserves slots, it can be considered as a circuit-switched connection between the master and the slave. The SCO link typically supports time-bounded information such as voice. The master can support up to seven SCO links to the same slave or to different slaves. A slave can support up to three SCO links from the same master or two SCO links if the links originate from different masters. SCO packets are never retransmitted.

The ACL link is a point-to-multipoint link between the master and all the slaves participating on the PAN. In the slots not reserved for the SCO links, the master can establish an ACL link on a per-slot basis to any slave, including the slave devices already engaged in an SCO link. The ACL link provides a packet-switched connection between the master and all active slaves participating in the PAN. Both asynchronous and isochronous services are supported. Only a single ACL link can exist between a master and a slave. As the ACL links are primarily used for data transmission, packet retransmission is applied to ensure data integrity.

The data on the PAN channel is conveyed in packets. Each packet consists of three entities: the access code, the header, and the payload. The access code and header are of fixed size, either 72 bits or 54 bits. The payload can range from zero to a maximum of 2745 bits. The access code identifies all packets exchanged on the channel of the PAN. All packets sent in the same PAN are preceded by the same channel access code.

The Bluetooth audio-interface can use either a 64 kb/s log PCM format, A-law or μ-law compressed, or a 64 kb/s CVSD (Continuous Variable Slope Delta Modulation) format.

Figure 7A:
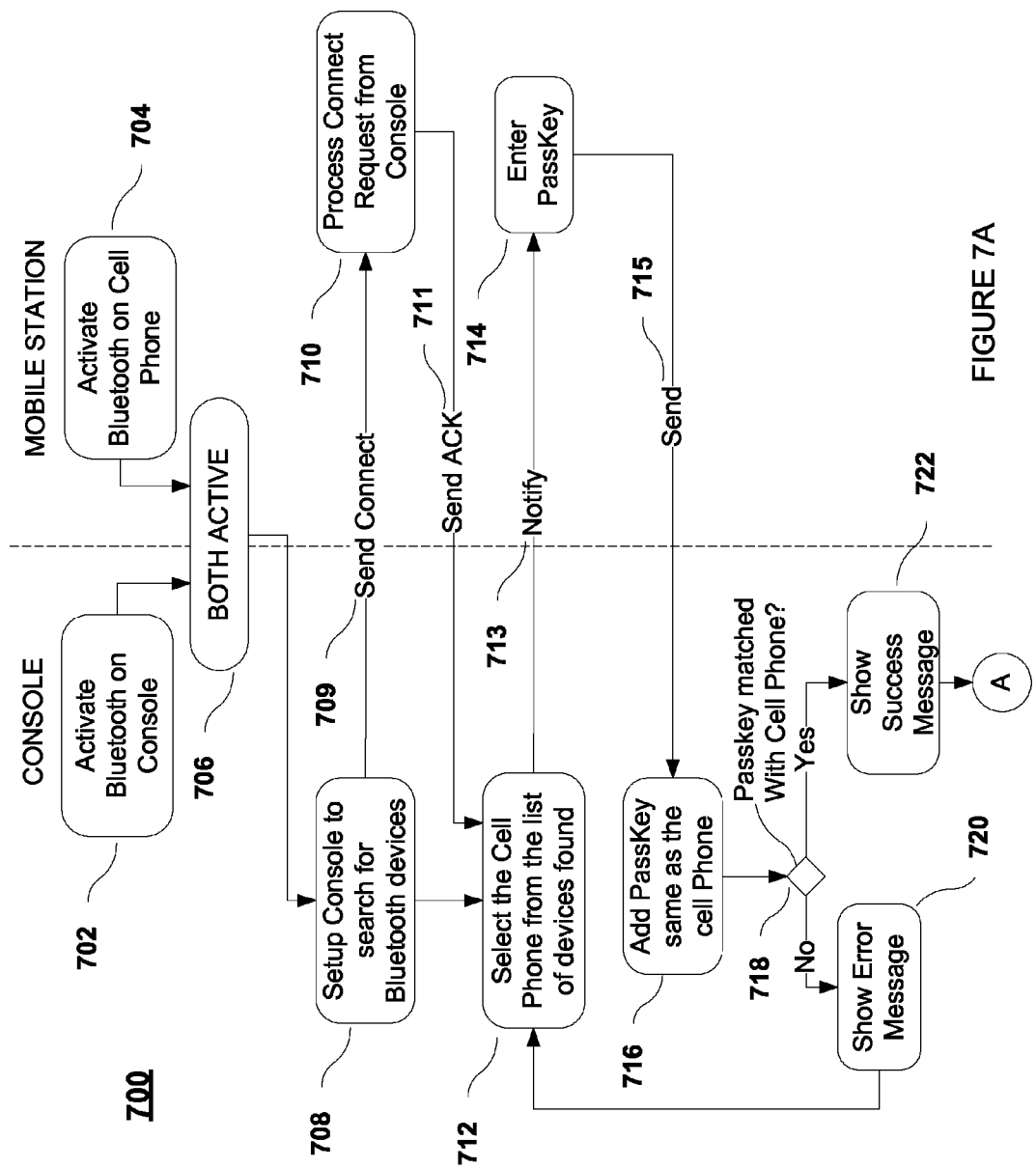
FIGS. 7A and 7B are flow charts of an example of a method of establishing a communication link between a mobile station and a console system.
Figure 7B:
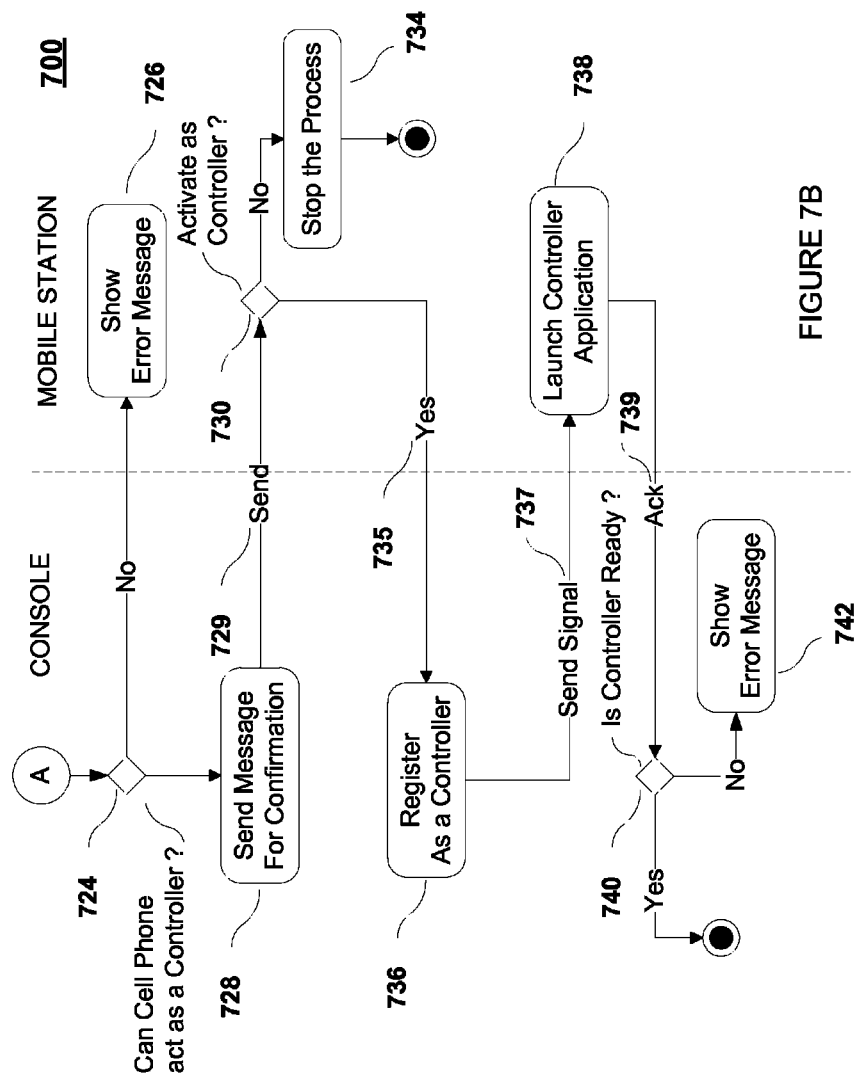

FIGS. 7A and 7B are flow charts of an example of a method 700 of establishing a communication link between a mobile station and a console system. The method 700 can be performed, for example, by the console system 102 or 200 (and/or an intermediary device such as the PC 112) and the mobile station 108 over a Bluetooth short range wireless network.

The method 700 is illustrated with the console system 200 acting as the master and the mobile station 108 acting as the slave. However, the mobile station 108 could act the part of the master with the console system 200 acting the part of the slave. In addition, the position of master and slave can be switch between the mobile station 108 and the console system 200. At blocks 702 and 704, the console system 200 and the mobile station 108, respectively, individually activate the Bluetooth module. These activations can occur at different times. For example, the console system 200 can have Bluetooth activated continuously while the mobile station 108 may disable (turn off or put into sleep mode) the Bluetooth module for power saving reasons.

When both Bluetooth modules are active, at junction 706, the process 700 continues to block 708 where the console system 200 searches for Bluetooth devices. Upon locating a Bluetooth device a "connect-request" message 709 is sent to the mobile station 108. At block 710, the mobile station 108 processes the connect request message 709. Upon processing the connect request message 709, the mobile station 108 sends an acknowledgement message 711 to the console system 200.

Upon receiving the acknowledgement message 711, the console system 200 selects the mobile station 108 from the list of devices found (assuming that there is more than one Bluetooth device present). After selecting the mobile station 108 at the block 712, the console system 102 transmits a notification message 713 to the mobile station 108.

The example method 700 establishes a secure (encrypted) connection between the mobile station 108 and the console system 200. In some aspects an insecure connection can be used. In these insecure aspects, the remaining blocks 714-722 can be omitted.

Upon receiving the notification message 713, the user of the mobile station 108 enters a passkey at block 714. The mobile station 108 transmits a message 715 containing the passkey to the console system 200. At block 716, the user enters the same pass key into the console system 200.

At decision block 718, the console system 200 determines if the two passkeys match. If the passkeys match, a success message is displayed on the video display 104 at block 722 and the process 700 continues to decision block 724 (see FIG. 7B). If the pass keys do not match, an error message is displayed on the video display 104 and the process 700 returns to block 712 to repeat the security process.

If the pass key matched successfully, the console system 200 determines if the mobiles station 108 can act as a controller of the game. This determination can include determining that the mobiles station 108 has previously received the game controller application. If the mobile station cannot currently act as controller, the console system 200 transmits a negative message to the mobile station 108 reporting that the mobile station is not currently equipped to act as controller. The mobile station can display an error message at block 726.

At this point, the console system 200 and the mobile station 108 can initiate providing a game controller application as discussed above in reference to blocks 510 and 515 in FIG. 5 and at blocks 610 and 615 in FIG. 6, and discussed in detail below in reference to FIG. 8.

If it was determined, at the decision block 724, that the mobile station 108 can act as the controller, the process 700 continues to block 728 where the console system 200 sends a confirmation message 729 to the mobile station 108. The mobile station 108 can then display a message querying the user if they want to activate the game controller application. At decision block 730, the mobile station processor 305 determines if the user wishes to activate the controller application. If the user indicates (through a key press, for example) that they do not wish to activate the controller application, the mobile station 108 stops the process at block 734.

If it is determined, at the decision block 730, that the user wishes to activate the mobile station 108 as the controller, the mobile station 108 transmits a positive reply message 735 to the console system 200. The console system 200 then registers the mobile station as a controller at block 736 and sends a confirmation message 737 to the mobile station 108.

Upon receiving the confirmation message 737, the mobile station 108 launches the game controller application at the block 738 and sends an acknowledgement message 739 to the console system 200. The acknowledgement message 739 can include an indication of whether or not the game controller application was launched successfully. At decision block 740, the console system determines, based on the acknowledgement message indication, If the game controller application is ready.

If it is determined that the mobile station 108 is ready to be a controller, at block 740, the process 700 can terminate and the mobile station 108 can assume the role of controller in the game being executed. If it is determined that the mobile station is not ready to be a controller, at block 740, the console system 200 can display an error message on the video display 104 and steps 738-740 can be repeated. Alternatively, a new game controller application could be provided to the mobile station 108 as discussed above. It should be noted that the blocks of method 700 in FIG. 7 can be rearranged, combined, modified and in some cases omitted.

Figure 8:
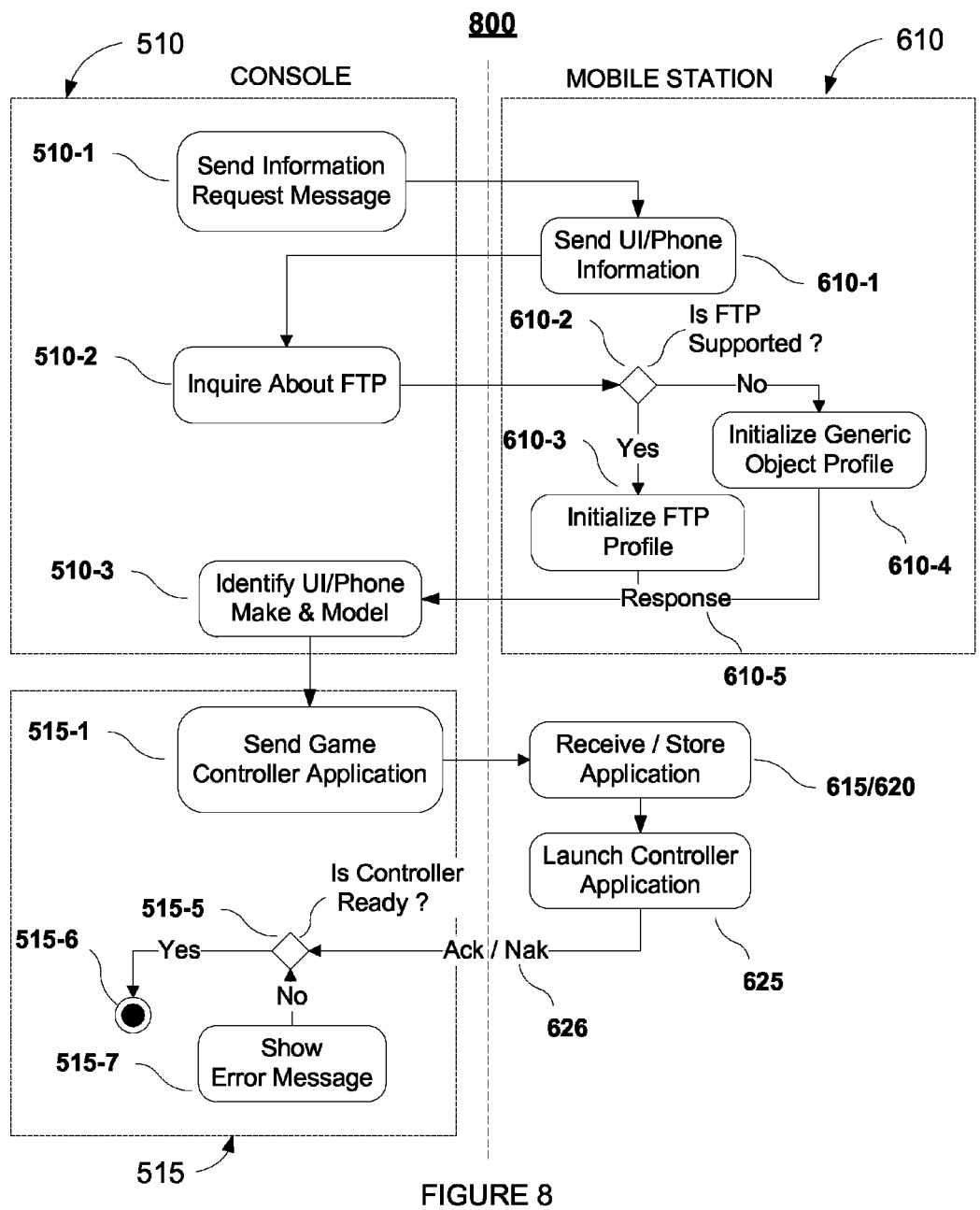
FIG. 8 is a flow chart of an example of a method of communicating a game controller application from a console system to a mobile station.

FIG. 8 is a flow chart of an example of a method 800 of communicating a game controller application from a console system to a mobile station. The method 800 can be performed, for example, by the console system 102 or 200 (and/or an intermediary device such as the PC 112) and the mobile station 108 over a Bluetooth short range wireless network. The method 800 illustrates examples of signaling between the console system 200 and the mobile station 108 during execution of the functions at the blocks 510 and 515 in the method 500 of FIG. 5 and the blocks 610-625 in the method 600 of FIG. 6.

The method 800 starts at block 510-1 where the console system 200 sends an information request message to the mobile station 108. The request message can be a request to the mobile station 108 to send make and model information to the console system (e.g., an IMEI number in aspects where the mobile station 108 is a cell phone). The request message could also be a request for the mobile station 108 to send an HID descriptor packet.

Upon receiving the information request message from the console system 200, the mobile station 108 sends a response containing the requested user interface and/or make and model information at block 610-1. For example, the response message sent at block 610-1 can contain the make and model information, or the HID descriptor, depending on what was requested by the console system 200.

Upon receiving the information sent by the mobile station 108 at the block 610-1, the console system 200 can determine what transfer protocol to use to transmit the game controller application to the mobile station 108. In this example, the console system is configured to default to using the file transfer protocol, or FTP. FTP is a standardized protocol allowing for exchange of files between devices. FTP is based on OBEX (short for object exchange). OBEX was standardized by the Infrared Data Association and has been adopted by the Bluetooth Special Interest Group.

At block 510-2, the console system 200 sends a message to the mobile station 108 inquiring if the mobile station 108 supports FTP. Upon receiving the FTP inquiry message, the mobile station 108 determines, at decision block 610-2, if it supports FTP. If the mobiles station supports FTP, the process 800 continues to block 610-3 where the mobile station initializes the FTP. If the mobile station 108 does not support FTP, the process 800 continues at block 610-4 where the mobile station initializes the Generic Object Exchange profile (referred to as GOEP in Bluetooth terminology). GOEP is a Bluetooth profile and is also based on OBEX. Upon initializing either FTP or GOEP, the mobile station sends a response message 610-5 indicating which profile (FTP or GOEP) is to be used for obtaining the game controller application.

Upon receiving the response message 610-5, the consoles system identifies the user interface characteristics of the mobile station 108. As was described above, the console system can obtain/create a game controller application based on the identified user interface and/or the make and model of the mobile station 108. At block 515-1, the console system sends the game controller application to the mobile station 108. The mobile station receives and stores the game controller application at the blocks 615 and 620. The mobile station 108 then launches the game controller application at block 625 and transmits an acknowledgement (Ack) or negative acknowledgement (Nak) message indicating whether or not it was successful in launching the game controller application.

Upon receiving the Ack or Nak message, the console system 200 determines, at decision block 515-5, if the mobile station game controller application was launched successfully. If the game controller application was successfully launched, indicated by an Ack, the process 800 concludes at 515-6 and the console system 200 can start the game or continue a current game and include the mobile station 108 as a controller. If the game controller application was not successfully launched, indicated by a Nak, the console system displays an error message at block 515-7. In response to the Nak message, the console system 200 can attempt to transmit another game controller application or wait until an Ack message is received from the mobile station 108 indicating that the mobile station has successfully launched the game controller application on a later attempt.

It should be noted that the blocks of method 800 in FIG. 8 can be rearranged, combined, modified and in some cases omitted.

Figure 9:
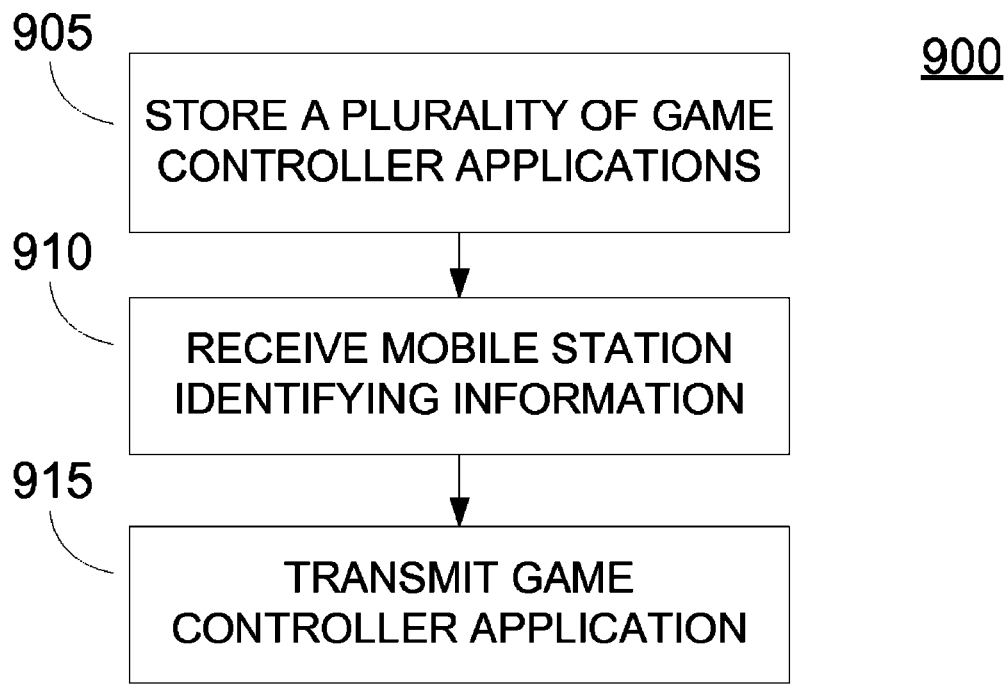
FIG. 9 is a flow chart of a method of distributing game controller applications from a controller application server to a console system and/or a mobile station.

FIG. 9 is a flow chart of a method 900 of distributing game controller applications from a controller application server to a console system and/or a mobile station. The method 900 can be performed, for example, by the controller application server 106 of FIGS. 1 and 4.

The method 900 starts at block 905 where the processor 405 stores a plurality of game controller applications in memory 410. The plurality of game controller applications could have been created previously as described above. In one aspect, preconfigured applications can be stored and cross referenced to the make or model of the mobile station 108 for which they were configured. In this aspect, an IMEI, or other information identifying a make and model of the mobile station 108, can be used to locate the game controller application. In another aspect, the preconfigured applications can be stored and cross referenced to features present in a interface device description such as the HID descriptor discussed above. In this aspect, the game controller application can be identified based on UI features that are or are not present in the HID descriptor, for example.

The game controller applications can be created and stored at the block 905 when new mobile station makes and models are identified or when improvements to the game controller applications are made. In this way, the most up to date game controller applications can be supplied to the users.

At block 910, the network interface 520 receives mobile station identifying information. In one aspect, the mobile station identifying information is received from the console system 200 or from an intermediary device such as the PC 112. In another aspect, the mobile station identifying information is received from the mobile station 108. As was described above, the mobile station identifying information can be a make and model or a user interface description such as the HID descriptor. Using the mobile station identifying information, the processor 405 can identify a game controller application using the cross referencing with which the game controller applications were stored in the memory 410 at the block 905.

If the processor 405 is unable to identify a preconfigured game controller application based on the make and model information and/or the user interface description, there are some options available. If the make and model cannot be located in the cross references with which the applications were stored, the controller application server can obtain a user interface description from a website such as a manufacturer's website, a retailer's website, a service provider's website or other website that may have a description and/or a picture of the device corresponding to the make and model information. Upon identifying the user interface features, a game controller application designed for a make and model with similar features can be identified.

If the user interface description is received at the block 910 and the processor 405 is unable to identify a preconfigured game controller application with a similar user interface, the processor 405 can create a new game controller application. Methods similar to those described above in reference to the block 515 of FIG. 5 can be used to create the new game controller application.

Upon receiving and identifying or creating a game controller application based on the information received at the block 910, the process 900 continues at block 915 where the network interface 420 transmits the game controller application. In one aspect, the game controller application is transmitted to the device from which the controller application server received the mobile station identifying information at block 910 (e.g., the console system 200, the intermediary PC 112 or the mobile station 108).

In another aspect, the game controller application is transmitted to a device other than the device from which the information was received at the block 910. For example, the console system 200 (or the PC 112) can transmit the mobile station identifying information at the block 910 and identify a network address (e.g., an email address or IP address) that is available to the mobile station 108. In this aspect, the game controller application can be transmitted to the mobile station 108 at the network address.

It should be noted that the blocks of method 900 in FIG. 9 can be rearranged, combined, modified and in some cases omitted.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method of enabling a mobile station to control a game, the method comprising:
    identifying a user interface characteristic of a mobile station;
    selecting a game controller application for the mobile station for controlling a game console system, the selection based on the identified user interface characteristic and a game playable on the game console system;
    providing the game controller application to the mobile station, the game controller application configured to execute on the mobile station in order to transform user interface inputs into game controller commands for use with the game console system and the game;
    receiving signals including data representing the game controller commands from the mobile station over a communication link; and
    determining game results based on the received data representing the game controller commands.

2. The method of claim 1, wherein receiving signals including data representing the game controller commands further comprises receiving signals including data representing input as registered by a user interface.

3. The method of claim 1, wherein receiving signals including data representing the game controller commands further comprises receiving signals including data representing game controller commands translated from input as registered by a user interface.

4. A method of enabling a mobile station to control a game, the method comprising:
    at a time during execution of a game on a game console system when a player is invited to be included in the game:
        identifying a user interface characteristic of a mobile station;
        selecting a game controller application for the mobile station for controlling the game console system, the selection based on the identified user interface characteristic;
        providing the game controller application to the mobile station, the game controller application configured to execute on the mobile station in order to transform user interface inputs into game controller commands for use with the game console system and;
        receiving signals including data representing the game controller commands from the mobile station over a communication link; and
        determining game results based on the received data representing the game controller commands.

5. The method of claim 4, wherein communicating with a game controller application on a mobile station further comprises communicating with the game controller application after the game controller application has been started on the mobile station.

6. The method of claim 4, wherein the game controller application is provided after accepting an invitation to be included in the game.

7. A method of enabling a mobile station to control a game, the method comprising:
    identifying a user interface characteristic of a mobile station;
    selecting a game controller configuration file for a game controller application on the mobile station for controlling a game console system, the selection based on the identified user interface characteristic;
    providing the game controller configuration file to the mobile station, the game controller application configured to execute on the mobile station and use the game controller configuration in order to transform user interface inputs into game controller commands for use with the game console system;
    receiving signals including data representing the game controller commands from the mobile station over a communication link; and
    determining game results based on the received data representing the game controller commands.

8. The method of claim 7, wherein identifying the user interface characteristic of the mobile station further comprises communicating with the game controller application.

9. The method of claim 8, wherein communicating with the game controller application comprises receiving make and model information of the mobile station over the communication link, and identifying the user interface characteristics corresponding to the make and model of the mobile station.

10. A method of enabling a mobile station to control a game, the method comprising:
    communicating with a game controller application executing on a mobile station to identify a user interface characteristic of a mobile station;
    selecting game controller code for the mobile station for controlling a game console system, the selection based on the identified user interface characteristic;
    providing the game controller code to the game controller application executing on the mobile station, the game controller application with game controller code configured to transform user interface inputs into game controller commands for use with the game console system;
    receiving signals including data representing the game controller commands from the mobile station over a communication link; and
    determining game results based on the received data representing the game controller commands.

11. The method of claim 10, wherein the game controller application is downloaded from a remote server to the mobile station.

12. The method of claim 10, wherein the game controller code is selected from at least one of a configuration object or an executable object.

13. A method of enabling a mobile station to control a game, the method comprising:
    identifying a user interface characteristic of a mobile station;
    selecting a game controller configuration file for a game controller application executing on the mobile station for controlling a game console, the selection based on the identified user interface characteristic, the game controller application having been downloaded from a remote server;
    providing the game controller configuration file to the mobile station, the game controller application configured to execute on the mobile station in order to transform user interface inputs into game controller commands for use with the game console;

receiving signals including data representing the game controller commands from the mobile station over a communication link; and determining game results based on the received data representing the game controller commands.

14. The method of claim 13, wherein the remote server forms at least a portion of a remote supplier of applications to the mobile station.

15. The method of claim 13, wherein identifying the user interface further comprises communicating with the game controller application to identify a user interface characteristic of the mobile station.

16. A method of enabling a mobile station to control a game, the method comprising:

identifying a user interface characteristic of a mobile station;

selecting a game controller application for the mobile station for controlling a game console system, the selection based on the identified user interface characteristic;

providing a network address to retrieve the game controller application for the mobile station from a remote server, the game controller application configured to execute on the mobile station in order to transform user interface inputs into game controller commands for use with the game console system;

receiving signals including data representing the game controller commands from the mobile station over a communication link; and determining game results based on the received data representing the game controller commands.

17. The method of claim 16, further comprising providing network access to the mobile station over the communication link.

18. The method of claim 17, wherein providing network access further comprises providing network access to the network address to download the game controller application.

19. The method of claim 18, wherein in the network address resolves to a remote supplier that provides applications to the mobile station.

20. The method of claim 16, wherein identifying the user interface characteristic of the mobile station is based upon identifying a make and model of the mobile station.

* * * * *